No. 615,173. Patented Nov. 29, 1898.
J. M. HESS.
FEED MILL.
(Application filed July 26, 1897.)
(No Model.) 3 Sheets—Sheet 2.
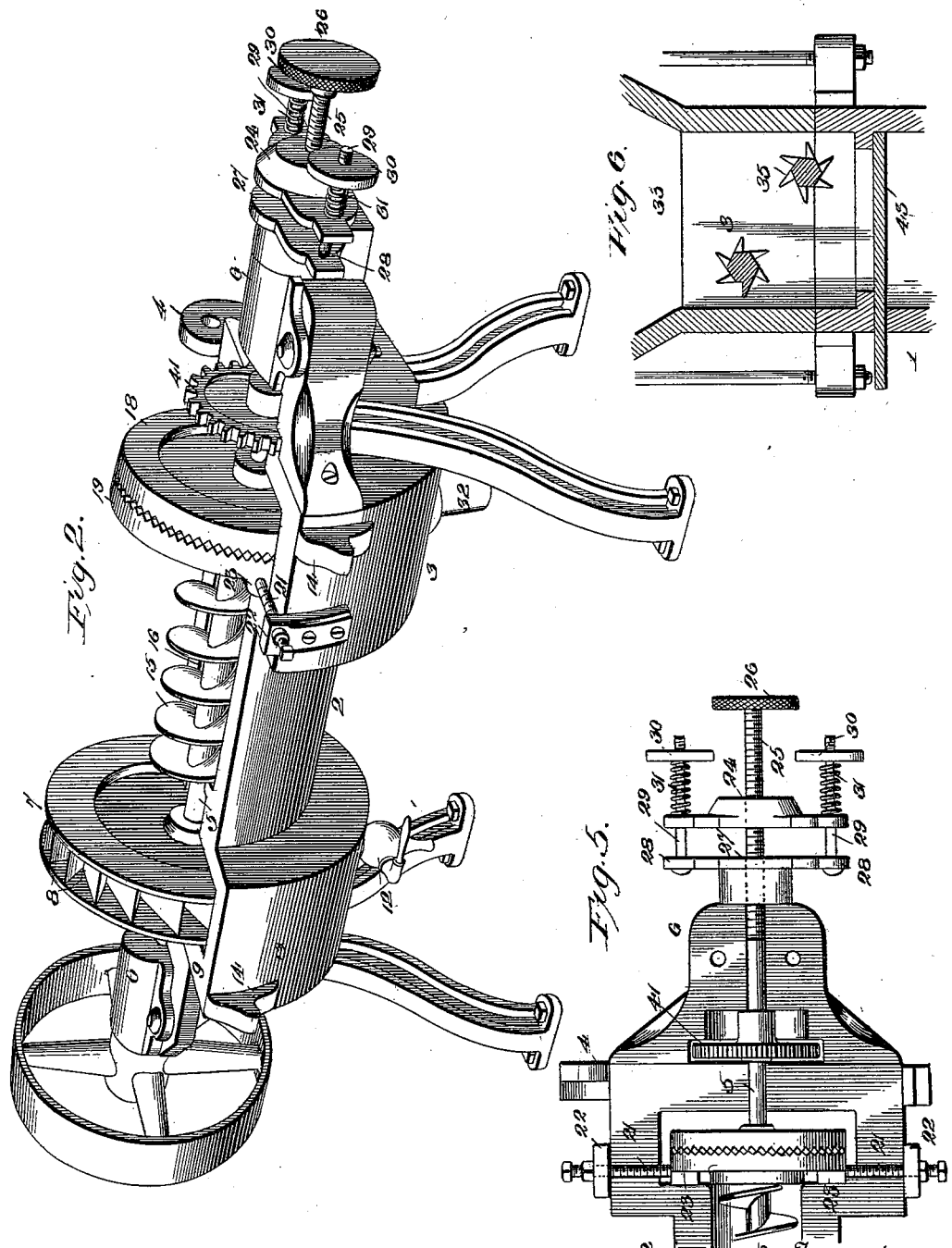
Witnesses
Jos. C. Stack
Geo. C. Byrne
Inventor
John M. Hess
By John Wedderburn
Attorney

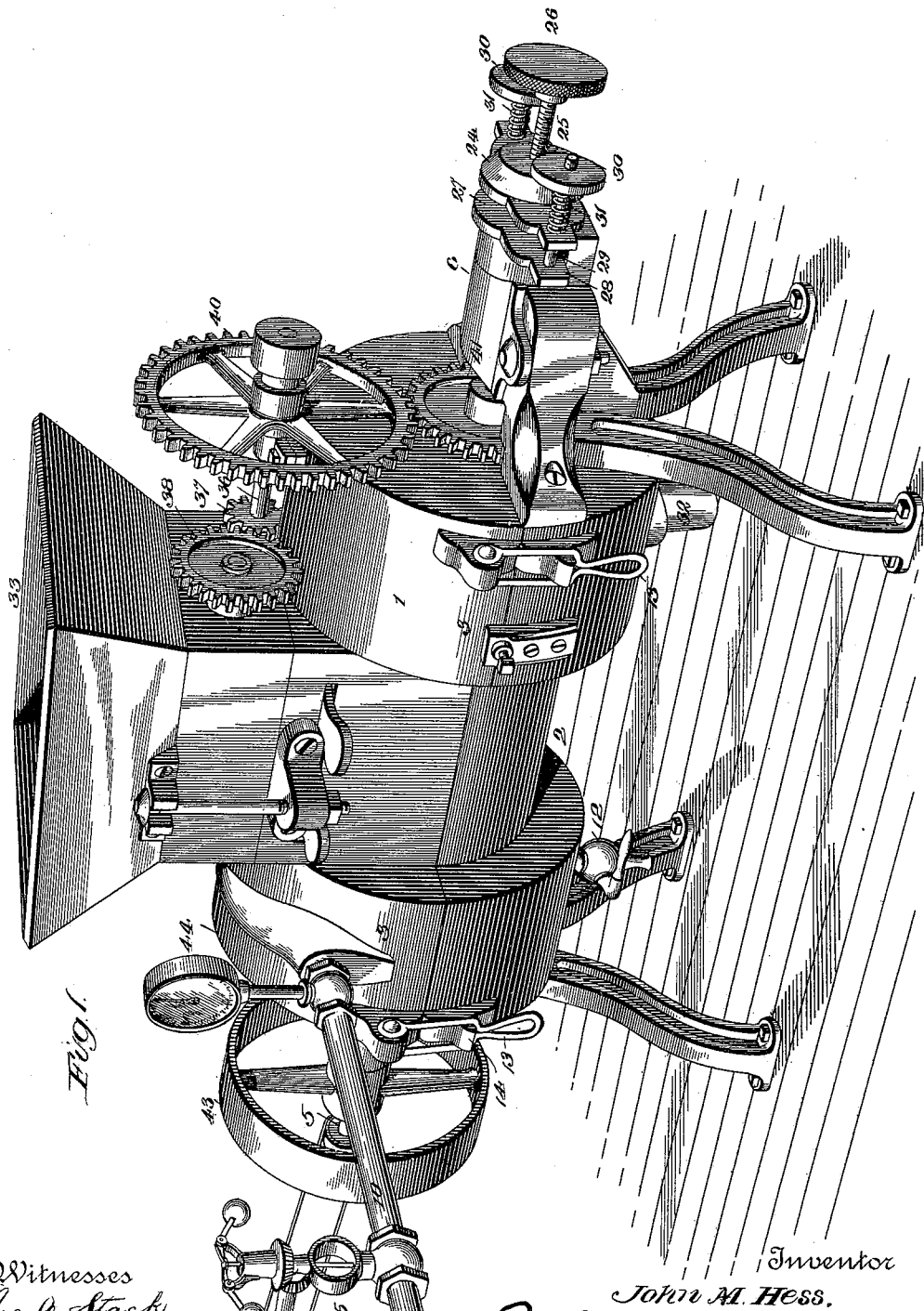

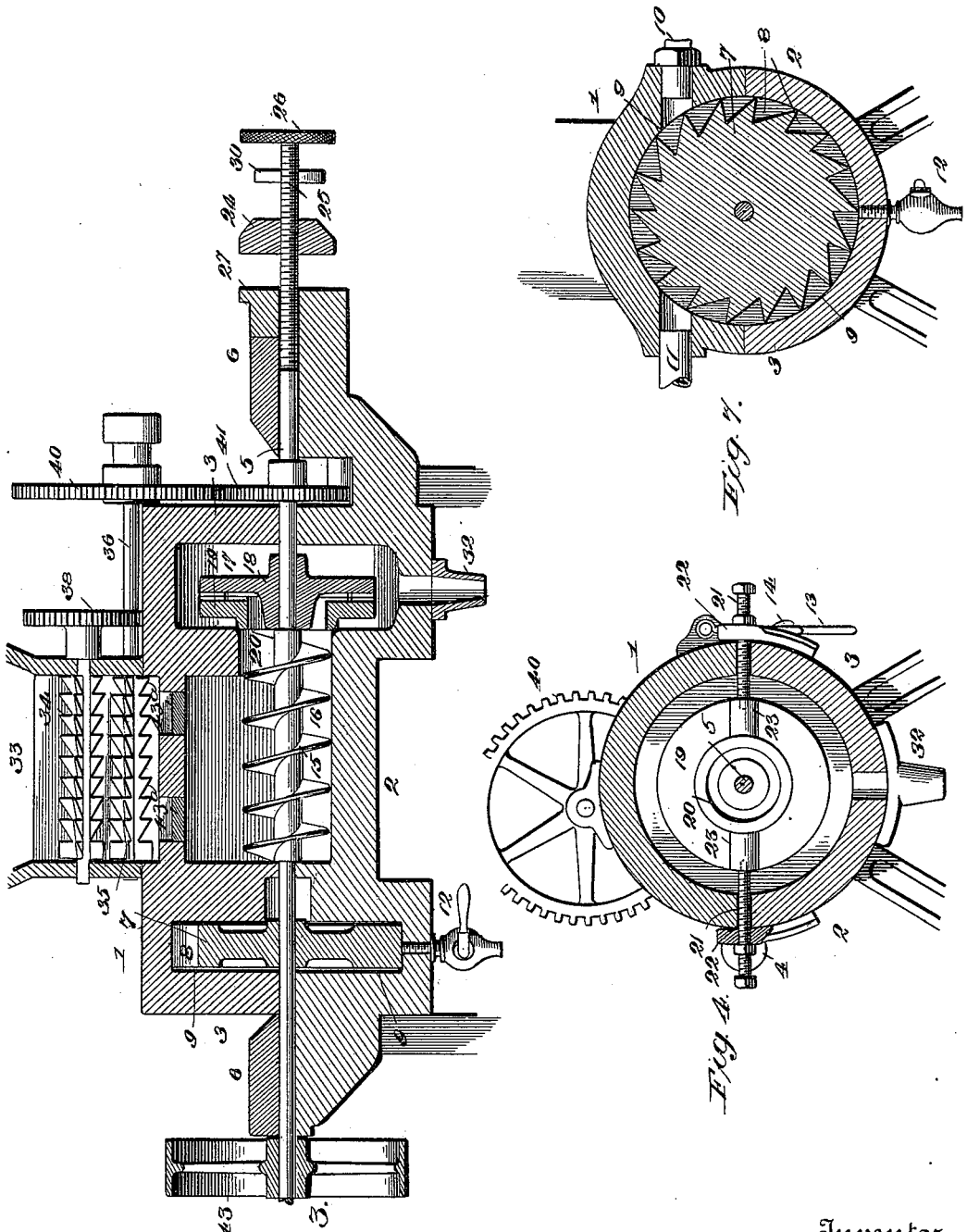

UNITED STATES PATENT OFFICE.

JOHN M. HESS, OF IVESTER, IOWA.

FEED-MILL.

SPECIFICATION forming part of Letters Patent No. 615,173, dated November 29, 1898.

Application filed July 26, 1897. Serial No. 645,911. (No model.)

*To all whom it may concern:*

Be it known that I, JOHN M. HESS, of Ivester, in the county of Grundy and State of Iowa, have invented certain new and useful Improvements in Feed-Mills; and I do hereby declare the following to be a full, clear, and exact description of the invention, such as will enable others skilled in the art to which it appertains to make and use the same.

This invention relates to feed-mills, and has for its object to provide a simple and efficient machine for grinding corn, &c., the machine embodying means whereby a rotary bur may be adjusted as to its pressure with relation to an oscillating bur, and provision also being made whereby the machine may be driven by steam or water power or by the direct application of a driving-belt from any suitable motor. Provision is also made for obtaining ready access to the working parts of the mill and for regulating the flow of feed to the conveyer.

The detailed objects and advantages of the invention will be pointed out in the course of the subjoined description.

The invention consists in an improved feed-mill embodying certain novel features and details of construction and arrangement of parts, as hereinafter fully described, illustrated in the drawings, and incorporated in the claim hereto appended.

In the accompanying drawings, Figure 1 is a perspective view of the improved feed-mill. Fig. 2 is a similar view with the upper portion of the casing removed. Fig. 3 is a longitudinal section through the machine. Fig. 4 is a cross-section taken adjacent to the oscillating bur. Fig. 5 is a detail plan view of one end of the machine, showing the tension device for the yielding rotating bur. Fig. 6 is a central cross-section taken through the hopper and showing one of the adjustable gates or cut-offs. Fig. 7 is a cross-section taken in line with the motor-wheel.

Similar numerals of reference designate corresponding parts in the several views.

Referring to the drawings, the casing of the feed-mill is shown as comprising two sections, 1 designating the upper section and 2 the lower section. The casing complete resembles a cylinder with enlarged end portions 3, and the sections of the casing meet upon a central diametrical line and are hinged together at the rear of the casing, as indicated at 4.

5 designates the main shaft, which is mounted in suitable bearings 6 at the ends of the machine. This shaft is provided at one point with a motor-wheel 7, comprising a series of peripheral buckets or cups 8 and working in recesses 9 in the upper and lower sections of the casing. The wheel 7 is fast on the shaft 5 and is adapted to be actuated by steam, water, or other fluid which is admitted to the chamber or recess 9 through a supply-pipe 10, entering the upper section of the casing and extending in substantially tangential relation to the motor-wheel. The upper section of the casing is provided at the rear side with a discharge-orifice 11 for the escape of the steam, water, &c., and the lower section of the casing is provided with a drip-cock 12, which communicates with the space in which the motor-wheel revolves for carrying off the water of condensation. The upper and lower sections of the casing are securely held together by means of bail-shaped hasps 13, pivotally connected to one of said sections and adapted to fit over and engage keepers or projections 14 on the other section.

At an intermediate point the shaft 5 has mounted thereon a spiral conveyer 15, working in a longitudinal cylindrical concavity 16 in the central portion of the casing for conveying material as it falls from the hopper to the grinding-burs.

In a cylindrical recess or chamber 17, at the opposite end of the casing from the motor-wheel 9, is arranged a pair of grinding-burs, one bur 18 being fast on the shaft 5 while the other or inner bur 19 is provided with an enlarged central opening 20, through which the material is fed by the conveyer 15. The bur 19 is supported at diametrically opposite points by threaded bolts 21, which pass through threaded openings in ears 22 on the lower section of the casing and at their inner ends enter sockets 23 in the bur 19 at diametrically opposite points. By this construction the bur 20 is adapted to oscillate on a horizontal axis and diametrical line, thus accommodating itself to the material being operated upon by the burs and in order to prevent injury to the burs by nails and other hard objects being caught between the same.

At one end of the machine is arranged a longitudinally-movable head 24, having a threaded opening to receive a tension-screw 25, provided at its outer end with a milled head 26, whereby the screw may be turned, the inner end of said screw bearing against the adjacent end of the main shaft 5. At the same end of the machine is a stationary head 27, having laterally-projecting ears 28, from which extend bolts or rods 29, threaded upon their extremities to receive nuts 30. The head 24 is adapted to slide upon the bolts 29, and spiral springs 31 are interposed between the ears of said movable head and the nuts 30, the tension of said springs being exerted to force the tension-screw 25 inward against the shaft 5, thereby pressing the rotating bur with proportionate force against the oscillating bur. By adjusting the nuts 30 and the screw 25 the pressure on the shaft 5 may be increased or diminished to suit requirements. Arranged under the grinding-burs and communicating with the chamber 17 is a discharge-spout 32, beneath which may be placed a receptacle for catching the product of the mill.

The upper section of the casing is provided with a hopper 33, and within the contracted lower portion of said hopper is arranged a pair of feed-rolls 34 and 35, the roll 34 being arranged in a higher plane than the roll 35. Both of said feed-rolls are toothed and they are arranged in oblique alinement. The shaft 36 of the feed-roll 35 is extended through the side wall of the lower portion of the hopper and is provided with a pinion 37, which meshes with the spur-wheel 38 on the extended shaft of the upper feed-roll 34, the difference in the sizes of said gear-wheels causing differential motion to be imparted to said feed-rolls. The shaft 36 is extended beyond the main casing, where it is provided with a large spur gear-wheel 40, fast on said shaft and meshing with another spur-gear 41, fast on the main shaft 5 of the machine, so that the motion of the shaft 5 is communicated through the medium of the train of gearing above described to the feed-rolls for revolving the latter at the proper rate of speed. In the bottom of the hopper beneath the feed-rolls is arranged a pair of sliding gates or cut-offs 43, which may be adjusted for regulating the rapidity of flow of the material to the interior of the main casing or to the spiral conveyer 15. By means of said gates the flow may be altogether cut off when desired.

Instead of imparting motion to the machine by means of the motor-wheel described a pulley may be mounted fast on the extended end of the main shaft, and motion may be imparted to said pulley by means of a suitable driving-belt from any convenient motor in a manner that will be readily understood. Connected with the supply-pipe 10 is a steam-pressure gage 44, and arranged outside of said gage is a governor 45, by means of which the speed of the mill may be regulated. The pulley 43ª may also be used for driving other machinery, thus taking advantage of any surplus of energy derived from the motor contained in the mill.

From the foregoing description it will be seen that by means of the construction described in connection with the oscillating and rotating burs in the event of nails and other hard objects finding their way between the burs the rotating bur may yield away from the oscillating bur, so as to permit the escape of such objects without injury to the milled faces of the burs, the oscillation of one of the burs materially aiding the escape of such objects. By increasing or diminishing the pressure on the rotating bur the machine may be adapted for coarse or fine milling.

The machine is adapted for grinding all kinds of feed and, as stated, may be operated by steam or vapor of any kind or by water-power.

It will be understood that the machine and the several parts thereof are susceptible of changes in the form, proportion, and minor details of construction, which may accordingly be resorted to without departing from the principle or sacrificing any of the advantages of the invention.

Having thus described the invention, what is claimed as new, and desired to be secured by Letters Patent, is—

In a feed-mill, a cylindrical casing divided diametrically and comprising a grinding-chamber, a motor-wheel chamber, and an intermediate conveyer-chamber lying between the grinding-disks and motor-wheel chamber, a main shaft extending through the several chambers, a driving-pulley thereon, a motor-wheel, grinding-disks, and a spiral conveyer also mounted on said shaft, a hopper arranged above the conveyer-chamber, regulating-slides in the bottom of the hopper, feed-rolls in the base of the hopper, and gearing interposed between the main shaft and said feed-rolls, all arranged for joint operation, substantially as described.

In testimony whereof I have signed this specification in the presence of two subscribing witnesses.

JOHN M. HESS.

Witnesses:
   A. C. FETTERS,
   T. A. HESS.